US009106070B2

(12) United States Patent (10) Patent No.: US 9,106,070 B2
Carlino et al. (45) Date of Patent: Aug. 11, 2015

(54) DISPLAY UNIT CONFIGURED TO DISPLAY TRIP INFORMATION AND CIRCUIT INTERRUPTER INCLUDING THE SAME

(71) Applicant: EATON CORPORATION, Cleveland, OH (US)

(72) Inventors: Harry James Carlino, Export, PA (US); Brian Scott Caffro, Aliquippa, PA (US); Lloyd Allen Maloney, Beaver, PA (US); David Richard Olenak, Bridgeville, PA (US)

(73) Assignee: EATON CORPORATION, Cleveland, OH (US)

( * ) Notice: Subject to any disclaimer, the term of this patent is extended or adjusted under 35 U.S.C. 154(b) by 157 days.

(21) Appl. No.: 13/787,061

(22) Filed: Mar. 6, 2013

(65) Prior Publication Data

US 2014/0254052 A1 Sep. 11, 2014

(51) Int. Cl.
*H01H 71/04* (2006.01)
*H02H 3/04* (2006.01)
*H02H 1/06* (2006.01)
*G08B 21/00* (2006.01)

(52) U.S. Cl.
CPC . *H02H 3/04* (2013.01); *H02H 1/06* (2013.01); *G08B 21/00* (2013.01)

(58) Field of Classification Search
USPC .......................................................... 361/115
See application file for complete search history.

(56) References Cited

U.S. PATENT DOCUMENTS 4,428,022 A 1/1984 Engel et al.
5,159,319 A * 10/1992 Dunk et al. ................... 340/546
5,408,187 A * 4/1995 Mackie ......................... 324/555
5,488,338 A * 1/1996 Seymour et al. .............. 335/202
5,525,985 A 6/1996 Schlotterer et al.
5,910,760 A 6/1999 Malingowski et al.
6,144,271 A 11/2000 Mueller et al.
7,075,427 B1 * 7/2006 Pace et al. ................ 340/539.22
7,948,343 B2 5/2011 Carlino et al.
8,169,757 B2 * 5/2012 Larson et al. ................... 361/42

(Continued)

FOREIGN PATENT DOCUMENTS

EP 1 589 628 A2 10/2005
FR 2 757 697 A1 6/1998

(Continued)

OTHER PUBLICATIONS

European Patent Office, "International Search Report and Written Opinion", Mar. 27, 2014, 9 pp.

*Primary Examiner* — Ronald W Leja

(74) *Attorney, Agent, or Firm* — Eckert Seamans Cherin & Mellott, LLC; Nathaniel C. Wilks

(57) ABSTRACT

A display unit is configured for use with a circuit interrupter which outputs a trip notification, trip information, and direct current power to the display unit The display unit comprises: a processor having a routine; a secondary power source configured to output secondary power; a memory display configured to receive the direct current power or the secondary power; and a power source selection circuit configured to switch the memory display from the direct current power to the secondary power in response to the display unit receiving the trip notification, wherein the routine of said processor is structured to control the memory display to display the trip information in response to the display unit receiving the trip notification.

21 Claims, 4 Drawing Sheets

(56) References Cited

U.S. PATENT DOCUMENTS

| | | |
|---|---|---|
| 2005/0047045 A1 | 3/2005 | Puskal et al. |
| 2005/0237216 A1* | 10/2005 | Viaro et al. ................ 340/693.2 |
| 2006/0119344 A1* | 6/2006 | Benke et al. .................. 324/126 |
| 2007/0097595 A1* | 5/2007 | Radivojevic et al. ......... 361/302 |
| 2009/0190289 A1* | 7/2009 | Bellotto et al. ................ 361/620 |
| 2009/0195337 A1 | 8/2009 | Carlino et al. |
| 2010/0149711 A1* | 6/2010 | Larson et al. ................. 361/93.1 |
| 2010/0321837 A1* | 12/2010 | Caiti et al. ...................... 361/18 |
| 2012/0319476 A1* | 12/2012 | De Natale et al. ............. 307/19 |
| 2014/0018942 A1* | 1/2014 | Stachow et al. ................. 700/83 |
| 2014/0254052 A1* | 9/2014 | Carlino et al. .................. 361/62 |

FOREIGN PATENT DOCUMENTS

| | | | |
|---|---|---|---|
| WO | 2009/090143 A1 | 7/2009 | |
| WO | WO 2014089637 A1 * | 6/2014 | ............... H02H 3/00 |

* cited by examiner

DISPLAY UNIT CONFIGURED TO DISPLAY TRIP INFORMATION AND CIRCUIT INTERRUPTER INCLUDING THE SAME

BACKGROUND

1. Field

The disclosed concept relates generally to display units, and in particular, to display units configured to display trip information. The disclosed concept also relates to circuit interrupters including a display unit configured to display trip information.

2. Background Information

Circuit interrupters, such as circuit breakers, are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Industrial circuit breakers often use a circuit breaker frame, which houses a trip unit. See, for example, U.S. Pat. Nos. 5,910,760 and 6,144,271. The trip unit may be modular and may be replaced, in order to alter the electrical properties of the circuit breaker.

It is well known to employ trip units which utilize a microprocessor to detect various types of overcurrent trip conditions and provide various protection functions, such as, for example, a long delay trip, a short delay trip, an instantaneous trip, and/or a ground fault trip. The long delay trip function protects the load served by the protected electrical system from overloads and/or overcurrents, The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

The earliest electronic trip unit circuit designs utilized discrete components such as transistors, resistors and capacitors.

More recently, designs, such as disclosed in U.S. Pat. Nos. 4,428,022 and 5,525,985, have included microprocessors, which provide improved performance and flexibility. These digital systems sample the current waveforms periodically to generate a digital representation of the current. The microprocessor uses the samples to execute algorithms, which implement one or more current protection curves.

When diagnosing field issues with a circuit interrupter, the cause of the trip and other information (e.g., without limitation, each phase current and the ground current at the time of the trip) are beneficial in diagnosing the issue. it is known to employ a liquid crystal display unit in conjunction with a circuit interrupter to display the cause of trip and other information. The liquid crystal display unit employs a battery or a rechargeable battery as a secondary power source in order to maintain the display of the cause of trip and other information during a circuit interruption. This is because the circuit interrupter loses its power source during a circuit interruption. However, batteries, even rechargeable ones, have a limited lifespan and must be periodically replaced, thus adding to the maintenance cost of the known liquid crystal display unit.

There is room for improvement in circuit interrupters.

There is also room for improvement in display units for use with circuit interrupters.

SUMMARY

These needs and others are met by embodiments of the disclosed concept, which provide a display unit including a memory display configured to display trip information. These needs and others are also met by embodiments of the disclosed concept, which provide a display unit including a bi-stable display configured to display trip information. These needs and others are also met by embodiments of the disclosed concept, which provide a circuit interrupter including a display unit having a memory display configured to display trip information. These needs and others are also met by embodiments of the disclosed concept, which provide a circuit interrupter including a display unit having a bi-stable display configured to display trip information.

In accordance with aspects of the disclosed concept, a display unit is configured for use with a circuit interrupter which outputs a trip notification, trip information, and direct current power to the display unit. The display unit comprises: a processor having a routine; a secondary power source configured to output secondary power; a memory display configured to receive the direct current power or the secondary power; and a power source selection circuit configured to switch the memory display from the direct current power to the secondary power in response to the display unit receiving the trip notification, wherein the routine of the processor is structured to control the memory display to display the trip information in response to the display unit receiving the trip notification.

In accordance with other aspects of the disclosed concept, a display unit is configured for use with a circuit interrupter which outputs a trip notification, trip information, and direct current power to the display unit. The display unit comprises: a processor having a routine; and a bi-stable display, wherein the routine of the processor is structured to control the bi-stable display to display the trip information in response to the display unit receiving the trip notification.

In accordance with other aspects of the disclosed concept, a circuit interrupter configured to protect a power circuit comprises: an electronic trip unit configured to control interruption of the power circuit and to output a trip notification and trip information; a power supply configured to convert alternating current power from the power circuit to a direct current power; a display unit configured to receive the trip notification, the trip information, and the direct current power, the display unit comprising: a processor having a routine; a secondary power source configured to output secondary power; a memory display configured to receive the direct current power or the secondary power; and a power source selection circuit configured to switch the memory display from the direct current power to the secondary power in response to the display unit receiving the trip notification, wherein the routine of the processor is structured to control the memory display to display the trip information in response to the display unit receiving the trip notification.

In accordance with other aspects of the disclosed concept, a circuit interrupter configured to protect a power circuit comprises: an electronic trip unit configured to control interruption of the power circuit and to output a trip notification and trip information; a power supply configured to convert alternating current power from the power circuit to a direct current power; a display unit configured to receive the trip notification, the trip information, and the direct current power, the display unit comprising: a processor having a routine; and a bi-stable display, wherein the routine of the processor is structured to control the bi-stable display to display the trip information in response to the display unit receiving the trip notification.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
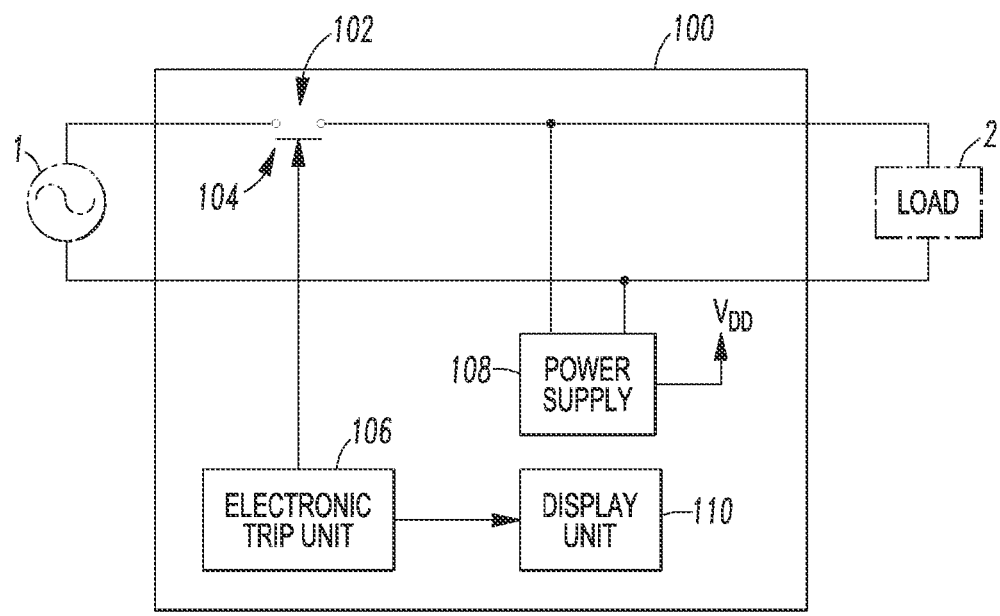
FIG. 1 is a schematic diagram in block form of a circuit interrupter in accordance with an example embodiment of the disclosed concept.

Directional phrases used herein, such as, fur example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts, As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "energy harvesting component" shall mean a component (or components) which is able to harvest electrical power from a non-electrical energy (e.g., without (imitation, solar energy; thermal energy; wind energy; kinetic energy).

As employed herein, the term "memory display" shall mean a display in which pixels of the display operate similar to memory cells. More particularly, once information is written to a pixel, that information is retained in the pixel until it is rewritten. Memory displays require relatively very little power (e.g., without limitation, microwatts) to maintain a display of information.

As employed herein, the term "bi-stable display" shall mean any one of the class of displays that maintain a display of information without power. Examples of types of hi-stable displays include, without limitation, nematic liquid crystal, polymer stabilized cholesteric liquid crystal, and electrophoretic ink ("E-ink") displays.

Referring to FIG. 1, a circuit interrupter 100 (e.g., without (imitation, a circuit breaker), is shown. The circuit interrupter 100 is configured to protect a power circuit including a power source 1 and a load 2. The circuit interrupter 100 includes separable contacts 102, an operating mechanism 104 structured to open and close the separable contacts 102, and an electronic trip unit 106 which cooperates with the operating mechanism 104 to trip open the separable contacts 102, The circuit interrupter 100 further includes a power supply 108 which converts a portion of alternating current flowing through the power circuit to direct current power $V_{DD}$. The direct current power $V_{DD}$ is used by digital components included in the circuit interrupter 100.

The circuit interrupter 100 also includes a display unit 110. The display unit 110 is communicatively coupled with the electronic trip unit 106. The display unit 110 receives a trip notification and trip information from the electronic trip unit 106. The trip notification is an indication that the electronic trip unit 106 has caused the operating mechanism 104 to trip open the separable contacts 102. In sonic embodiments the trip notification is, without limitation, a transition of a signal from high to low. The trip information is information regarding the trip (e.g., without limitation, the cause of the trip). The display unit 110 can also receive circuit interrupter setting information (e.g., without limitation; full load ampere setting ("Ir"); long delay time ("LDT"); short delay pickup ("SDPU"); short delay time ("SDI"); ground fault time ("GET")) and/or circuit interrupter diagnostic information (e.g., without limitation; over temperature protection set point; previous cause of trips; battery life; trip actuator voltage; trip actuator integrity; contact integrity; trip current magnitudes) from the electronic trip unit 106. The display unit 110 also receives the direct current power $V_{DD}$ output by the power supply 108.

The display unit 110 is configured to display the trip information in response to receiving the trip notification. Additionally, the display unit 110 is configured to continue to display the trip information after the power supply 108 has stopped providing the direct current power $V_{DD}$. The display unit 110 can also display the circuit interrupter setting information and/or the circuit interrupter diagnostic information. Example display units 310,410,510,610 are illustrated in FIGS. 3-6 and will be described in more detail hereinafter.

Figure 2:
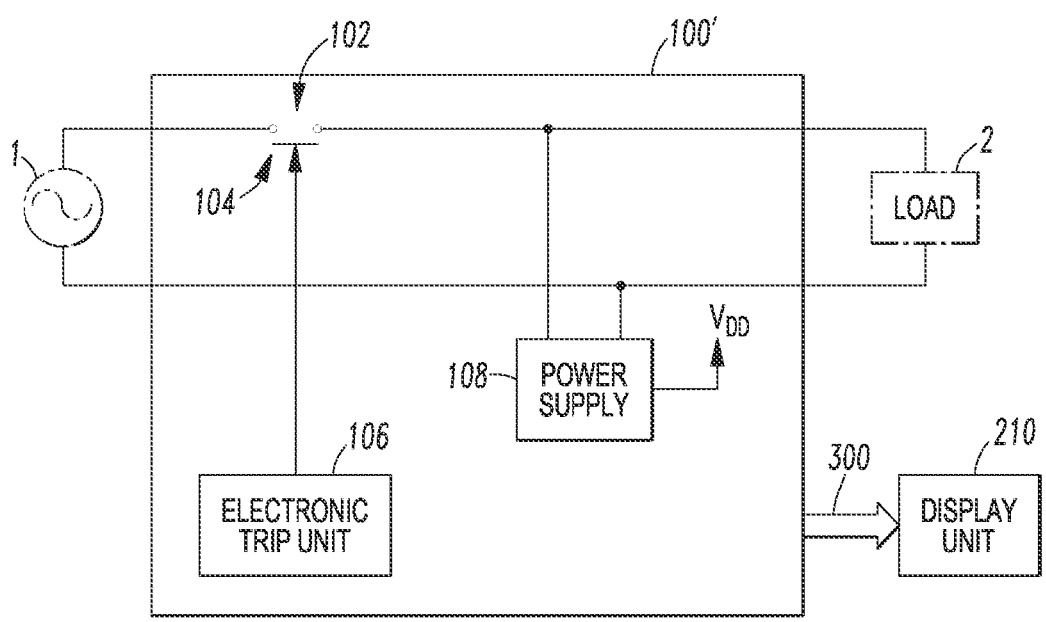
FIG. 2 is a schematic diagram in block form of a circuit interrupter coupled with a display unit in accordance with another embodiment of the disclosed concept.

In the example embodiment of the disclosed concept depicted in FIG. 1, the display unit 110 is installed in the circuit interrupter 100. Referring now to FIG. 2, a display unit 210 is configured for use with a circuit interrupter 100', rather than installed in it. The circuit interrupter 100' and the display unit 210 are communicatively coupled via an interface 300. The interface 300 may include, for example and without limitation, a test port of the circuit interrupter 100'. The display unit 210 receives a trip notification, trip information, and direct current power $V_{DD}$ from the circuit interrupter 100' via the interface 300. The display unit 210 can also receive circuit interrupter setting information and/or the circuit interrupter diagnostic information via the interface 300.

The display unit 210 is configured to display the trip information in response to receiving the trip notification. Additionally, the display unit 210 is configured to continue to display the trip information after the power supply 108 has stopped providing the direct current power $V_{DD}$. The display unit 210 can also display the circuit interrupter setting information and/or the circuit interrupter diagnostic information.

Figure 3:
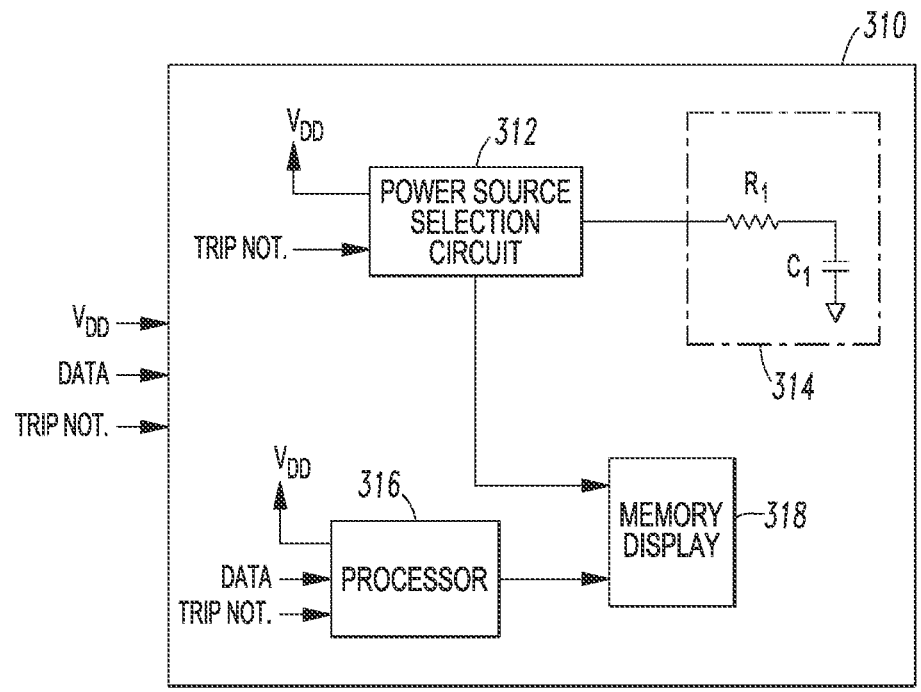
FIGS. 3-6 are schematic diagrams in block form of display units in accordance with other embodiments of the disclosed concept.

FIG. 3 shows another example display unit 310 that is configured to receive direct current power $V_{DD}$, data (e.g., without limitation; trip information; circuit interrupter diagnostic information; circuit interrupter setting information), and a trip notification. The display unit 310 includes a power source selection circuit 312, a secondary power source 314, a processor 316, and a memory display 318.

The power source selection circuit 312 is configured to receive the direct current power $V_{DD}$ and the trip notification. The power source selection circuit 312 is also electrically connected to the secondary power source 314 and the memory display 318. Prior to receiving the trip notification, the power source selection circuit 312 allows the memory display 318 to be powered by the direct current power $V_{DD}$.

The example secondary power source 314 includes a capacitor $C_1$ and a resistor $R_1$. Prior to receiving the trip notification, the power source selection circuit 312 allows the capacitor $C_1$ to be charged by the direct current power $V_{DD}$.

When the power source selection circuit 312 receives the trip notification, the power source selection circuit 312 switches the memory display 318 from the direct current power $V_{DD}$ to the secondary power source 314. The secondary power source 314 provides the memory display 318 with power stored in the capacitor $C_1$ until the capacitor $C_1$ is sufficiently discharged.

The display unit 310 also includes a processor 316 which receives the direct current power $V_{DD}$, the data, and the trip notification. The processor 316 includes a routine which is structured to control the memory display 318 to display the trip information in response to receiving the trip notification. The routine of the processor 316 can also control the memory display 318 to display the circuit interrupter setting information and/or the circuit interrupter diagnostic information.

The memory display 318 requires relatively very little power to maintain display of information. Power supplied by the capacitor $C_1$ allows the memory display 318 to maintain display of the trip information for an appreciable amount of time (e.g., without limitation, about 2 hours). It will be appreciated by those having ordinary skill in the relevant art that variations in the size of the capacitor $C_1$ will affect the amount of time that the memory display 318 can continue to display the trip information after a trip. It will also be appreciated that any suitable size capacitor $C_1$ can be selected without departing from the scope of the disclosed concept.

Figure 4:
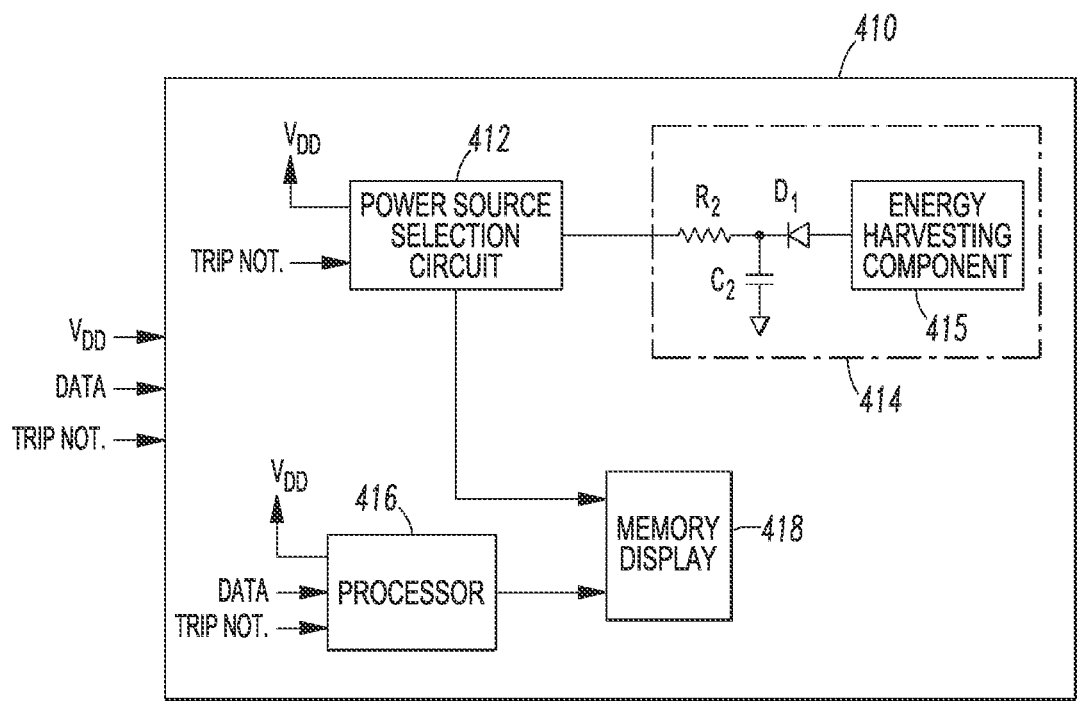

Referring to FIG. 4, a display unit 410 includes a power source selection circuit 412, a secondary power source 414, a processor 416, and a memory display 418. Processor 416 and memory display 418 are similar to respective processor 316 and memory display 318 described above with respect to display unit 310. Therefore, further description of these components is omitted.

The power source selection circuit 412 is configured to receive the direct current power $V_{DD}$ and the trip notification. The power source selection circuit 412 is also electrically connected to the secondary power source 414 and the memory display 418. Prior to receiving the trip notification, the power source selection circuit 412 allows the memory display 418 to be powered by the direct current power $V_{DD}$. When the power source selection circuit 412 receives the trip notification, the power source selection circuit 412 switches the memory display 418 from the direct current power $V_{DD}$ to the secondary power source 414.

The secondary power source 414 includes an energy harvesting component 415. The energy harvesting component 415 harvests non-electrical energy such as, for example and without limitation, heat energy or solar energy, and converts it into electrical power which can then be provided to the memory display 418. The energy harvesting component 415 can include, for example and without limitation, a photovoltaic cell or a thermoelectric generator. The secondary power source 414 can also include a capacitor $C_2$, a resistor $R_2$, and a diode $D_1$. Energy harvested by the energy harvesting component 415 can be stored in the capacitor $C_2$ before being provided to the memory display 418 or the harvested energy can be provided to the memory display 418 directly from the energy harvesting component 415.

Figure 5:
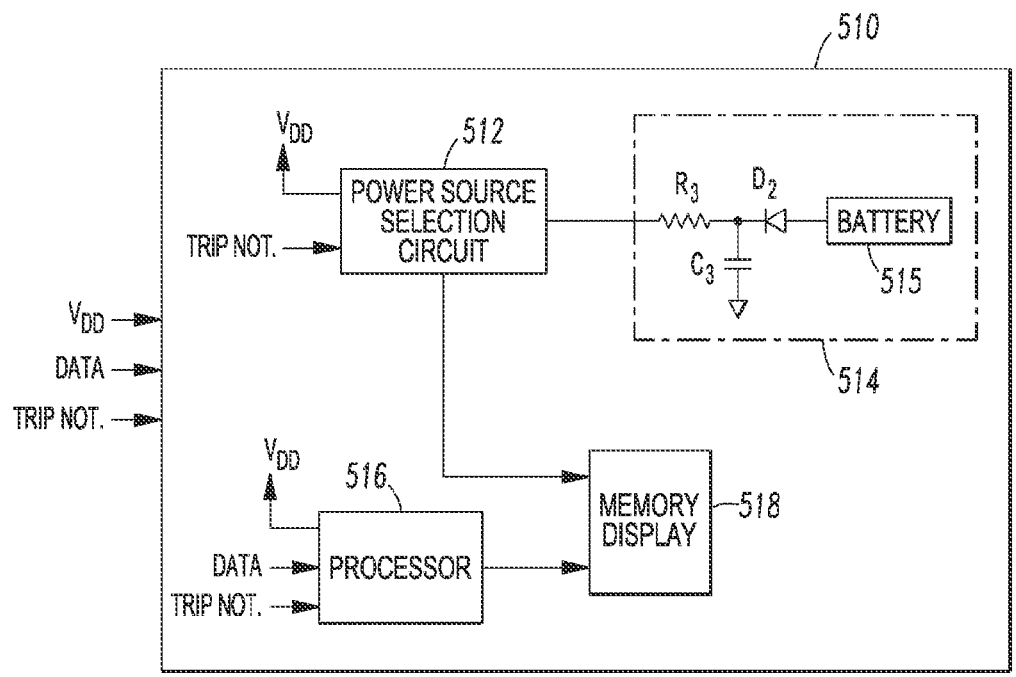

Referring to FIG. 5, a display unit 510 includes a power source selection circuit 512, a secondary power source 514, a processor 516, and a memory display 518. Processor 516 and memory display 518 are similar to respective processor 316 and memory display 318 described above with respect to display unit 310. Therefore, further description of these components is omitted.

The power source selection circuit 512 is configured to receive the direct current power $V_{DD}$ and the trip notification. The power source selection circuit 512 is also electrically connected to the secondary power source 514 and the memory display 518. Prior to receiving the trip notification, the power source selection circuit 512 allows the memory display 518 to be powered by the direct current power $V_{DD}$. When the power source selection circuit 512 receives the trip notification, the power source selection circuit 512 switches the memory display 518 from the direct current power $V_{DD}$ to the secondary power source 514.

The secondary power source 514 includes a battery 515. The secondary power source 514 can also include a capacitor $C_3$, a resistor $R_3$, and a diode $D_2$. Since the memory display 518 uses relatively little power, the memory display 518 draws less power from the battery 515 than a conventional liquid crystal display. In other words, the battery 515 can maintain display of information on the memory display 518 longer than it could on a similarly sized conventional liquid crystal display.

Figure 6:
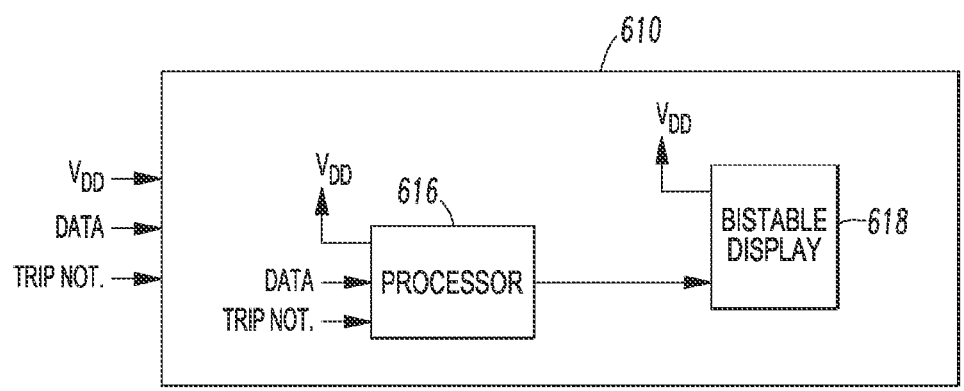

Referring to FIG. 6, a display unit 610 includes a processor 616 and a bi-stable display 618. Processor 616 is similar to processor 316 described above with respect to display unit 310. Therefore, further description of the processor 616 is omitted.

The bi-stable display 618 is able to maintain display of information without power. After the processor 616 receives the trip notification and controls the bi-stable display 618 to display the trip information, the direct current power $V_{DD}$ stops being supplied due to the trip. However, the bi-stable display 618 maintains display of the trip information without the direct current power $V_{DD}$ being supplied to it.

Figure 7:
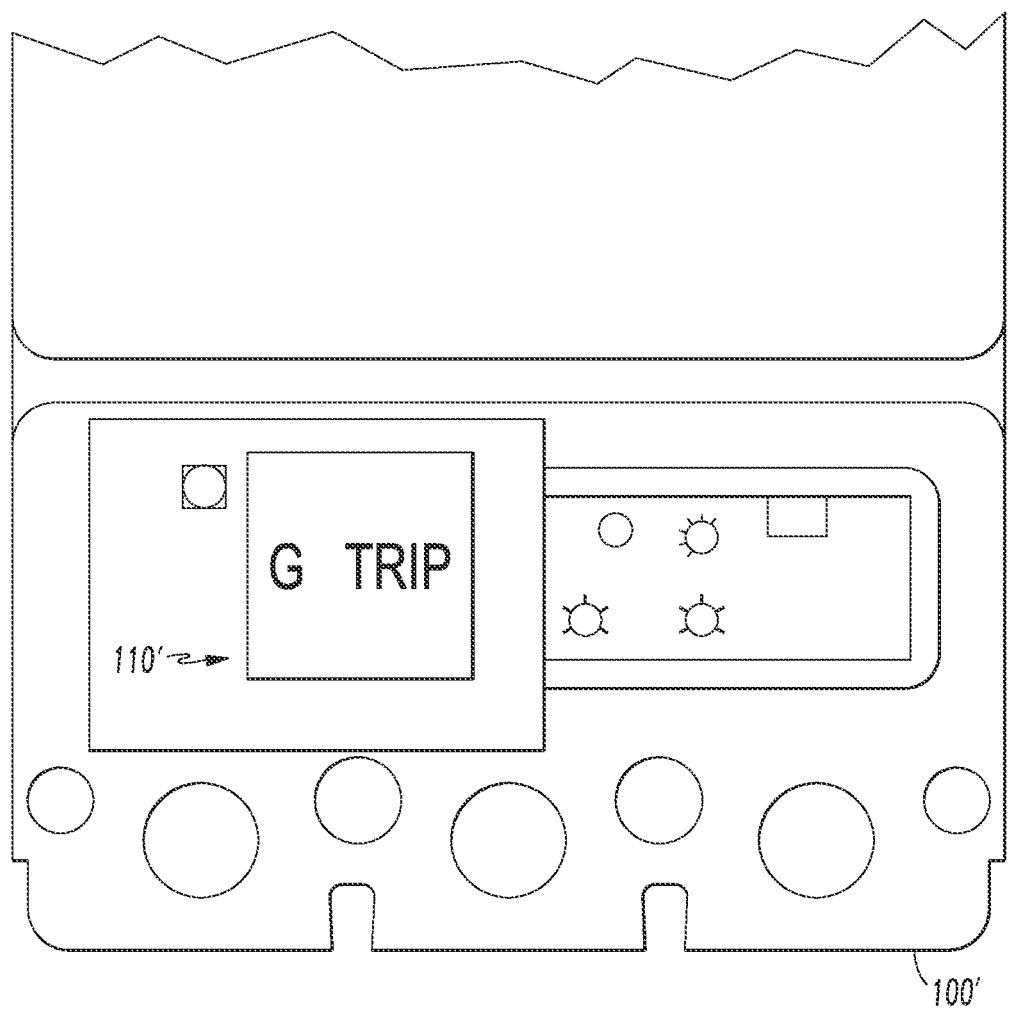
FIG. 7 is a front elevation view of a portion of a circuit interrupter having a display unit coupled thereto in accordance with embodiments of the disclosed concept.

It will be appreciated by one having ordinary skill in the art that any one of the display units 310, 410, 510, 610 disclosed herein can be installed in the circuit interrupter 100, fir example, as display unit 110 is. It will also be appreciated by one having ordinary skill in the art that any one of the display units 310, 410, 510, 610 can also be configured for use with the circuit interrupter 100', for example, as display unit 110' is. An example of the display unit 110' configured for use with and coupled to a test port (not shown) of the circuit interrupter 100' is depicted in FIG. 7.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A display unit configured for use with a circuit interrupter which outputs a trip notification, trip information, and direct current power to the display unit, the display unit comprising:
   a processor having a routine;
   a secondary power source configured to output secondary power;
   a memory display configured to receive the direct current power or the secondary power; and
   a power source selection circuit configured to switch the memory display from the direct current power to the secondary power in response to the display unit receiving the trip notification,
   wherein the routine of said processor is structured to control the memory display to display the trip information in response to the display unit receiving the trip notification, and
   wherein the memory display is structured to use greater than 0 mW and less than 1 mW of power to maintain display of the trip information.

2. The display unit of claim 1, wherein the secondary power source includes a capacitor configured to store power from the direct current power and to output the stored power as the secondary power.

3. The display unit of claim 1, wherein the secondary power source includes an energy harvesting component configured to harvest power from non-electrical energy; and wherein the secondary power source is configured to output the harvested power as the secondary power.

4. The display unit of claim 3, wherein the secondary power source includes a capacitor configured to store the harvested power.

5. The display unit of claim 3, wherein the energy harvesting component comprises at least one of a photovoltaic cell and a thermoelectric generator.

6. The display unit of claim 1, wherein the secondary power source includes a battery.

7. The display unit of claim 1, wherein the circuit interrupter is configured to output circuit interrupter setting information to the display unit; wherein the display unit is configured to receive said circuit interrupter setting information; and wherein the routine of said processor is structured to control the memory display to display said circuit interrupter setting information.

8. The display unit of claim 1, wherein the circuit interrupter is configured to output circuit interrupter diagnostic information; wherein the display unit is configured to receive said circuit interrupter diagnostic information; and wherein the routine of said processor is structured to control the memory display to display said circuit interrupter diagnostic information.

9. The display unit of claim 1, wherein the memory display includes a plurality of pixels; and wherein, when information is written to a selected one of the plurality of pixels, the memory unit is structured to retain the information in the selected pixel until other information is written to the selected pixel.

10. A display unit configured for use with a circuit interrupter which outputs a trip notification, trip information, and direct current power to the display unit, the display unit comprising:
   a processor having a routine; and
   a bi-stable display,
   wherein the routine of said processor is structured to control the bi-stable display to display the trip information in response to the display unit receiving the trip notification,
   wherein the circuit interrupter is configured to output circuit interrupter setting information including at least one of full load ampere setting, long delay time, short delay pickup, short delay time, and ground fault time to the display unit,
   wherein the display unit is configured to receive said circuit interrupter setting information, and
   wherein the routine of said processor is structured to control the bi-stable display to display said circuit interrupter setting information in response to the display unit receiving the trip notification.

11. The display unit of claim 10, wherein the circuit interrupter is configured to output circuit interrupter diagnostic information; wherein the display unit is configured to receive said circuit interrupter diagnostic information; and wherein the routine of said processor is structured to control the bi-stable display to display said circuit interrupter diagnostic information.

12. A circuit interrupter configured to protect a power circuit, the circuit interrupter comprising:
   an electronic trip unit configured to control interruption of said power circuit and to output a trip notification and trip information;
   a power supply configured to convert alternating current power from the power circuit to a direct current power;
   a display unit configured to receive the trip notification, the trip information, and the direct current power, the display unit comprising:
      a processor having a routine;
      a secondary power source configured to output secondary power;
      a memory display configured to receive the direct current power or the secondary power; and
      a power source selection circuit configured to switch the memory display from the direct current power to the secondary power in response to the display unit receiving the trip notification,
      wherein the routine of said processor is structured to control the memory display to display the trip information in response to the display unit receiving the trip notification, and
      wherein the memory display is structured to use greater han 0 mW and less than 1 mW of power to maintain display of the trip information.

13. The circuit interrupter of claim 12, wherein the secondary power source includes a capacitor configured to store power from the direct current power and to output the stored power as the secondary power.

14. The circuit interrupter of claim 12, wherein the secondary power source includes an energy harvesting component configured to harvest power from non-electrical energy; and wherein the secondary power source is configured to output the harvested power as the secondary power.

15. The circuit interrupter of claim 14, wherein the secondary power source includes a capacitor configured to store the harvested power.

16. The circuit interrupter of claim 14, wherein the energy harvesting component comprises at least one of a photovoltaic cell and a thermoelectric generator.

17. The circuit interrupter of claim 12, wherein the secondary power source includes a battery.

18. The circuit interrupter of claim 12, wherein the electronic trip unit is configured to output circuit interrupter setting information; wherein the display unit is configured to receive said circuit interrupter setting information; and wherein the routine of said processor is structured to control the memory display to display said circuit interrupter setting information.

19. The circuit interrupter of claim 12, wherein the electronic trip unit is configured to output circuit interrupter diagnostic information; wherein the display unit is configured to receive said circuit interrupter diagnostic information; and wherein the routine of said processor is structured to control the memory display to display said circuit interrupter diagnostic information.

20. A circuit interrupter configured to protect a power circuit, the circuit interrupter comprising:
- an electronic trip unit configured to control interruption of said power circuit and to output a trip notification and trip information;
- a power supply configured to convert alternating current power from the power circuit to a direct current power;
- a display unit configured to receive the trip notification, the trip information, and the direct current power, the display unit comprising:
  - a processor having a routine; and
  - a bi-stable display,
  - wherein the routine of said processor is structured to control the bi-stable display to display the trip information in response to the display unit receiving the trip notification,
  - wherein the circuit interrupter is configured to output circuit interrupter setting information including at least one of full load ampere setting, long delay time, short delay pickup, short delay time, and ground fault time to the display unit,
  - wherein the display unit is configured to receive said circuit interrupter setting information, and
  - wherein the routine of said processor is structured to control the bi-stable display to display said circuit interrupter setting information in response to the display unit receiving the trip notification.

21. The circuit interrupter of claim 20, wherein the electronic trip unit is configured to output circuit interrupter diagnostic information; wherein the display unit is configured to receive said circuit interrupter diagnostic information; and wherein the routine of said processor is structured to control the hi-stable display to display said circuit interrupter diagnostic information.

\* \* \* \* \*